(12) United States Patent
Benmimoun et al.

(10) Patent No.: US 11,117,467 B2
(45) Date of Patent: Sep. 14, 2021

(54) METHOD FOR OPERATING A SELF-DRIVING MOTOR VEHICLE

(71) Applicant: Ford Global Technologies, LLC, Dearborn, MI (US)

(72) Inventors: Mohamed Benmimoun, Aachen (DE); Muhammad Adeel Awan, Aachen (DE); Ahmed Benmimoun, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 16/261,139

(22) Filed: Jan. 29, 2019

(65) Prior Publication Data

US 2019/0241068 A1 Aug. 8, 2019

(30) Foreign Application Priority Data

Feb. 7, 2018 (DE) ...................... 10 2018 201 897.9

(51) Int. Cl.
| | |
|---|---|
| *B60K 28/02* | (2006.01) |
| *B60K 26/02* | (2006.01) |
| *B60T 17/18* | (2006.01) |
| *B60T 7/06* | (2006.01) |
| *G05D 1/00* | (2006.01) |
| *B60W 60/00* | (2020.01) |
| *B60W 50/10* | (2012.01) |

(Continued)

(52) U.S. Cl.
CPC .............. *B60K 28/02* (2013.01); *B60K 26/02* (2013.01); *B60K 26/021* (2013.01); *B60R 21/09* (2013.01); *B60T 7/06* (2013.01); *B60T 17/18* (2013.01); *B60W 50/10* (2013.01); *B60W 60/0053* (2020.02); *G05D 1/0061* (2013.01); *G05D 1/0088* (2013.01); *G05G 1/40* (2013.01); *B60K 2026/026* (2013.01); *B60K 2370/146* (2019.05); *B60K 2370/1468* (2019.05); *B60T 2220/02* (2013.01)

(58) Field of Classification Search
CPC ...... B60K 28/02; B60K 26/02; B60K 26/021; B60K 2026/026; B60T 17/18; B60T 7/06; B60T 2220/02; G05D 1/0061; G05D 1/0088; B60W 50/08; B60W 50/10; B60W 2050/0002; B60W 2050/0075; B60W 60/005; B60W 60/0053; B60W 60/0054
See application file for complete search history.

(56) References Cited

U.S. PATENT DOCUMENTS

| | | |
|---|---|---|
| 8,942,881 B2 | 1/2015 | Hobbs et al. |
| 9,483,059 B2 | 11/2016 | Caveney |

(Continued)

OTHER PUBLICATIONS

Manawadu, et. al., "A Hand Gesture Based Driver-Vehicle Interface to Control Lateral and Longitudinal Motions of an Autonomous Vehicle", 2016 IEEE International Conference on Systems, Man, and Cybernetics, SMC 2016, Oct. 9-12, 2016, Budapest, Hungary (6 pages).

*Primary Examiner* — Kevin P Mahne
(74) *Attorney, Agent, or Firm* — Frank A. MacKenzie; Bejin Bieneman PLC

(57) ABSTRACT

A method for operating a self-driving motor vehicle includes changing from a self-driving mode into a manual-driving mode, monitoring a footwell of the motor vehicle with a gesture recognition device, and checking whether at least one specified gesture is present.

8 Claims, 4 Drawing Sheets

(51) Int. Cl.
*G05G 1/40* (2008.04)
*B60R 21/09* (2006.01)

(56) References Cited

U.S. PATENT DOCUMENTS

| | | | |
|---|---|---|---|
| 10,744,906 B2* | 8/2020 | Sugioka | B60N 2/919 |
| 2009/0278915 A1 | 11/2009 | Kramer et al. | |
| 2014/0309886 A1 | 10/2014 | Ricci | |
| 2016/0039429 A1 | 2/2016 | Abou-Nasr et al. | |
| 2016/0090104 A1* | 3/2016 | Diaz-Jimenez | B60W 50/10 |
| | | | 701/70 |
| 2018/0074491 A1* | 3/2018 | Nakasu | G06F 1/163 |
| 2018/0186266 A1* | 7/2018 | Fitzpatrick | B60N 2/14 |
| 2019/0176785 A1* | 6/2019 | Hansmann | B60T 13/741 |

* cited by examiner

METHOD FOR OPERATING A SELF-DRIVING MOTOR VEHICLE

CROSS-REFERENCE TO RELATED APPLICATIONS

This application claims priority to German Application No. DE 10 2018 201 897.9, filed on Feb. 7, 2018, which application is hereby incorporated herein by reference in their entirety.

BACKGROUND

The present disclosure concerns a method for operating a self-driving motor vehicle. The present disclosure further concerns a computer program product for carrying out such a method, a control unit for a self-driving motor vehicle, and a motor vehicle with a control unit of this type.

Passenger vehicles or other motor vehicles that can drive, control, and park without the influence of a human driver (highly automated or autonomous driving), are referred to as a self-driving motor vehicle (sometimes also as an autonomous land vehicle). In the case in which no manual control on the part of the driver is necessary, the term robot auto is also used. In this case, the driver's seat can remain empty; conceivably, the steering wheel, brake pedal and gas pedal may not be present. The term "self-driving motor vehicle" also covers trucks, agricultural tractors and military vehicles without the influence of a driver or entirely without a driver.

Self-driving motor vehicles can however get into situations, such as for example bad weather conditions or on hillsides, which they cannot cope with autonomously. It can then be necessary for a driver to take over control of the motor vehicle in order to ensure road safety.

SUMMARY

It is therefore the object of the invention to show ways in which road safety can be guaranteed even in said situations.

The object of the invention is achieved by a method for operating a self-driving motor vehicle with the steps of
 changing from a self-driving mode into a manual driving mode
 monitoring a footwell of the motor vehicle with a gesture recognition device, and
 checking for the presence of at least one specified gesture.

Passenger vehicles or other motor vehicles that can drive, control and park (highly automated or autonomous driving) without the influence of a human driver are referred to as a self-driving motor vehicle (sometimes also an autonomous land vehicle). In the case in which no manual control on the part of the driver is necessary, the term robot auto is also used. The driver's seat can then remain empty; a steering wheel, brake pedal and gas pedal are not present.

The footwell means the free space in front of the driver' seat, in which the feet of the seated person are positioned. The passenger who controls the motor vehicle when required is considered to be the driver, such as can be the case with self-driving motor vehicles according to Level 3 or 4, for example. Accordingly, the side of the vehicle on which the driver sits is considered to be the driver's side. In the footwell on the driver's side, in conventional, i.e., non-self-driving motor vehicles there is a brake pedal, a gas pedal and possibly a clutch pedal.

A gesture means a movement of the driver's body that contains information. The gesture can be a rapid or abrupt forward movement of the driver's right or left foot in order to operate a brake pedal or a gas pedal. The gesture can also be a specified position of part of the driver's body, such as for example the position of his right foot.

The gesture recognition device can be embodied for unit-based or camera-based gesture recognition. Furthermore, the gesture recognition device can also be an infrared-based system or can be embodied to detect gestures based on changes in electrical field strength. Unit-based gesture recognition is based on acceleration sensors or position sensors that are worn on the driver's body and that the driver has to apply.

In the case of camera-based gesture recognition, cameras are used to contactlessly acquire driver image data. For this purpose, there are systems both with a camera and with a plurality of cameras, wherein the newer systems often operate with 3D data and either work by means of time-of-flight cameras or so-called structured light cameras. Such methods rely on techniques of 2D and 3D image analysis to detect the posture and movements of the driver.

While in the self-driving mode, a control unit controls the motor vehicle without the involvement of the driver. The manual driving mode is a mode in which the control unit switches after the driver has requested to take over the control of the motor vehicle. In addition or alternatively, it can also be provided that the driver can manually trigger a change from the self-driving mode to the manual driving mode by a specified gesture, for example if he has the impression that the control unit is overwhelmed by the management of the current traffic situation.

Thus, a driver can take over the control of the motor vehicle when required in order to ensure road safety.

According to one embodiment, the change from the self-driving mode into the manual driving mode can be triggered by a control unit of the motor vehicle and/or by a driver of the motor vehicle. In other words, the change from the self-driving mode into the manual driving mode is triggered in one case on the vehicle side and/or the change from the self-driving mode into the manual driving mode is triggered by the driver, for example wherein the driver carries out a gesture similar to a movement for carrying out emergency braking or a different specified gesture in order to cause a control change of the motor vehicle into the self-driving mode. As a result, the driver is also given the possibility to intervene, even if the control unit has not initiated a change from the self-driving mode into the manual driving mode. Road safety is thus increased even further.

According to a further embodiment, the specified gesture corresponds to an operating movement for brake pedal operation and/or gas pedal operation. A brake pedal (also known as a foot brake lever) is used in almost all motor vehicles to actuate the service brake system. It is disposed in the footwell of the driver's seat area and as a rule is operated by the driver with the right foot. Consequently, the specified gesture of a brake pedal operation is understood to mean, for example a forward movement, i.e., a movement in the driving direction of the motor vehicle. An accelerator pedal, colloquially a gas pedal, means a control element of motor vehicles with which the engine power of at least one traction engine of the motor vehicle can be controlled and/or regulated by the driver. It is also disposed in the footwell of the driver's seat area and as a rule is also operated by the driver with the right foot. Consequently, the specified gesture for gas pedal operation is understood to mean, for example a forward movement, i.e., a movement in the driving direction of the motor vehicle.

According to a further embodiment, in the manual driving mode at least one operating variable of the motor vehicle is varied depending on the specified gesture. Thus, the driver can control or influence the motor vehicle in the manual driving mode by means of gesture control. No conventional control elements are necessary, such as for example a brake pedal and/or a gas pedal.

According to a further embodiment, the operating variable is a deceleration and/or an acceleration of the motor vehicle. Thus, the driver can bring the motor vehicle to a standstill, for example, or can even accelerate the motor vehicle in order to resolve a traffic situation.

According to a further embodiment, in the manual driving mode at least one dummy pedal can be activated. The dummy pedal can operate as a dummy brake pedal or a dummy gas pedal. The dummy pedal has no control signal-transmitting connection to the service brake system and/or to the traction engine of the motor vehicle. Such control signals are provided by the gesture recognition device. However, the dummy pedal provides haptic feedback and thus enables the driver to regulate his gestures correctly or for example to hold his foot in a desired position.

According to a further embodiment, a spring-biased dummy pedal is enabled. This can be carried out for example if the control unit has requested the driver to take over control of the motor vehicle or the driver has manually triggered a change from the self-driving mode into the manual driving mode by a specified gesture. Thereupon, the dummy pedal can spring out, i.e., can rise up from a flat footwell floor or emerge from a recess. Thus, the dummy pedal otherwise takes up no space in the footwell, so that there is no restriction of the footwell in the self-driving mode.

Furthermore, the invention includes a computer program product and a control unit for carrying out such a method and a motor vehicle with a control unit of this type.

The invention is now described using a drawing. In the figures.

Figure 1:
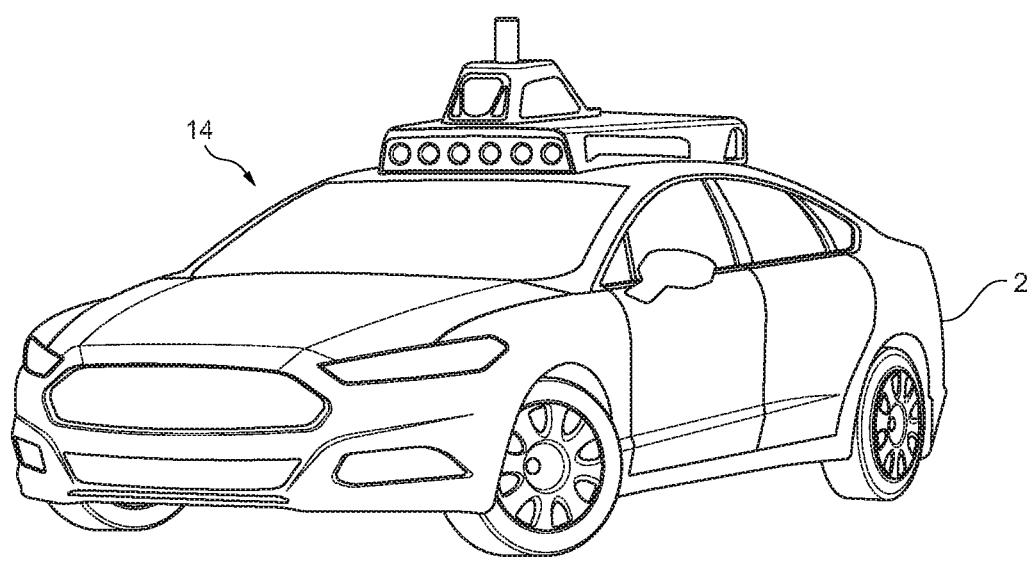
FIG. 1 shows a self-driving motor vehicle in a schematic representation.

Reference to first made to FIG. 1.

A motor vehicle 2 that is a passenger vehicle in the present exemplary embodiment is represented. In a different exemplary embodiment from the present exemplary embodiment, the motor vehicle can for example also be a truck or a bus.

Furthermore, in the present exemplary embodiment the motor vehicle 2 is embodied as a self-driving motor vehicle for highly automated or autonomous driving. In other words, the motor vehicle 2 can also be referred to as a robot auto that meets at least Level 3 (highly automated) of the classification of autonomous driving.

In this case, a Level 3 motor vehicle is understood to be a self-driving motor vehicle 2 that the driver does not have to constantly monitor. The motor vehicle 2 independently carries out functions such as triggering the indicators, lane changing and lane keeping. The driver can attend to other things, but when required must take over control within a warning time when required by a control unit 14.

In a difference from the present exemplary embodiment, the self-driving motor vehicle 2 can also be a Level 4 motor vehicle, for example, in which the control of the motor vehicle 2 is constantly carried out by the control unit 14. If the driving tasks are no longer being managed by the control unit 14, the driver can be requested to take over control of the motor vehicle 2.

For the described functions and tasks, in the present exemplary embodiment the control unit 14 comprises hardware and/or software components.

Figure 2:
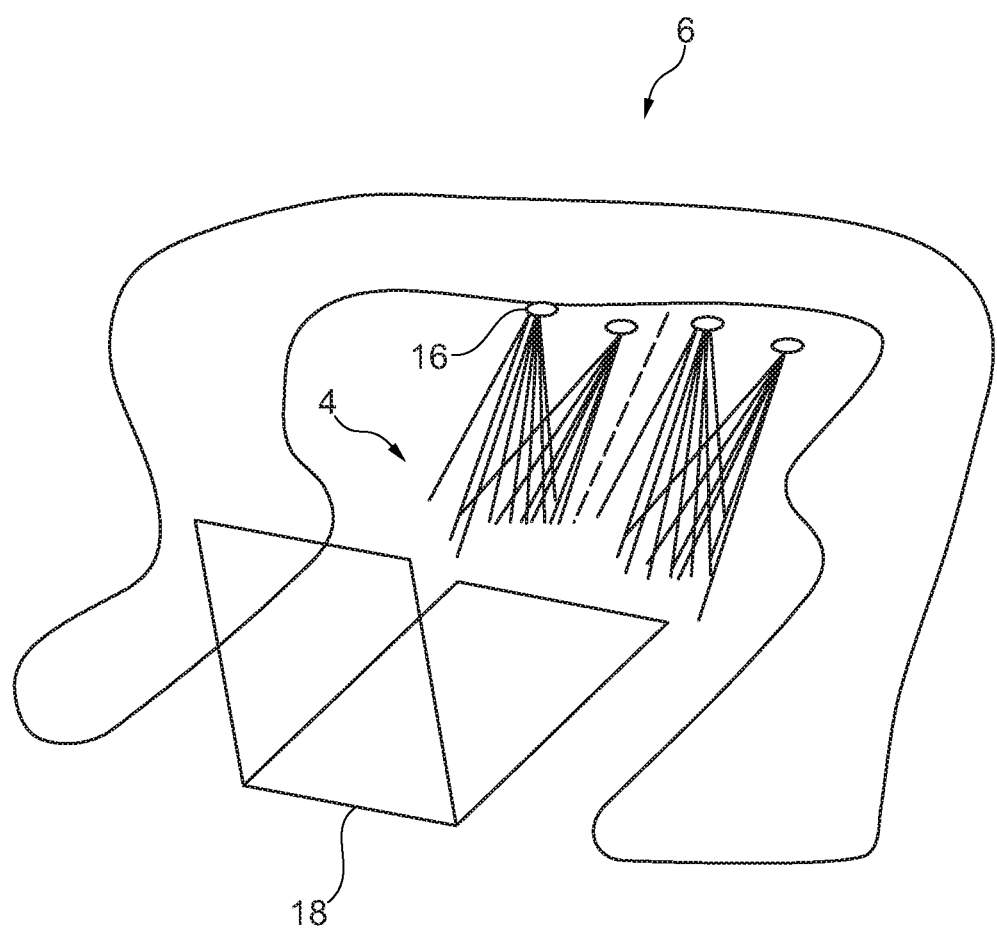
FIG. 2 shows a footwell of the motor vehicle represented in FIG. 1 in a schematic representation.

Reference is now made to FIG. 2.

In order to enable the driver to take over control of the motor vehicle 2, the motor vehicle 2 comprises a gesture recognition device 6 for monitoring a footwell 4 of the motor vehicle 2.

The footwell 4 is the free space for the driver in front of a driver's seat 18, in which the driver can position his feet. A passenger who controls the motor vehicle 2 when required is considered to be the driver, such as can be the case for example in self-driving motor vehicles according to Level 3 or 4.

The gesture recognition device 6 is embodied for camera-based gesture recognition in the present exemplary embodiment. For this purpose, the gesture recognition device 6 in the present exemplary embodiment comprises hardware and/or software components. Furthermore, the gesture recognition device 6 in the present exemplary embodiment comprises a number of cameras 16 that provide the 3D data. The cameras 16 can be time-of-flight cameras or so-called structured light cameras.

A gesture to be detected can be a rapid or abrupt forward movement of the driver's right foot in order to operate a brake pedal or a gas pedal. Furthermore, the gesture can also be a specified position of part of the driver's body, such as for example the position of his right foot.

The gesture recognition device 6 checks whether the gesture to be detected is present and causes a change from a self-driving mode into a manual driving mode if the specified gesture is present.

Figure 3:
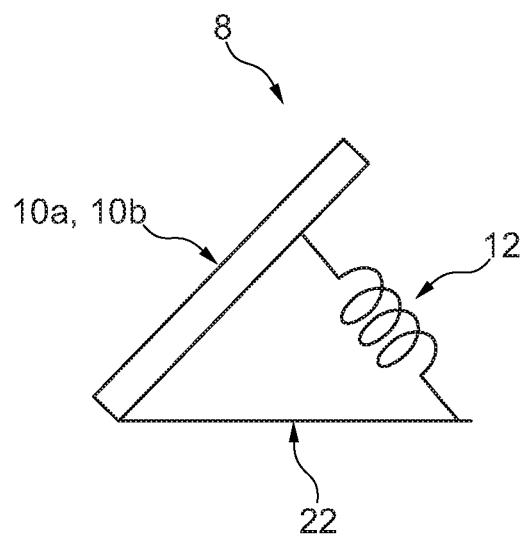
FIG. 3 shows further details of the footwell represented in FIG. 2 in a schematic representation.
Figure 4:
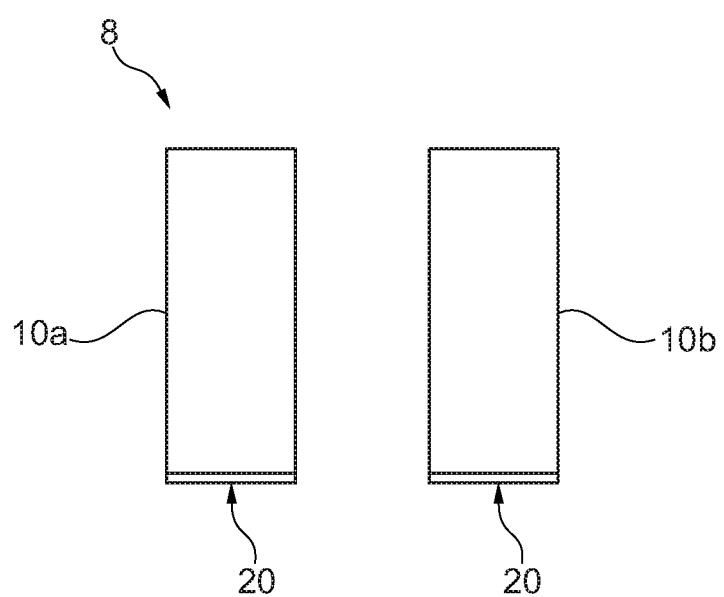
FIG. 4 shows further details of the footwell represented in FIG. 2 in a schematic representation.
Figure 5:
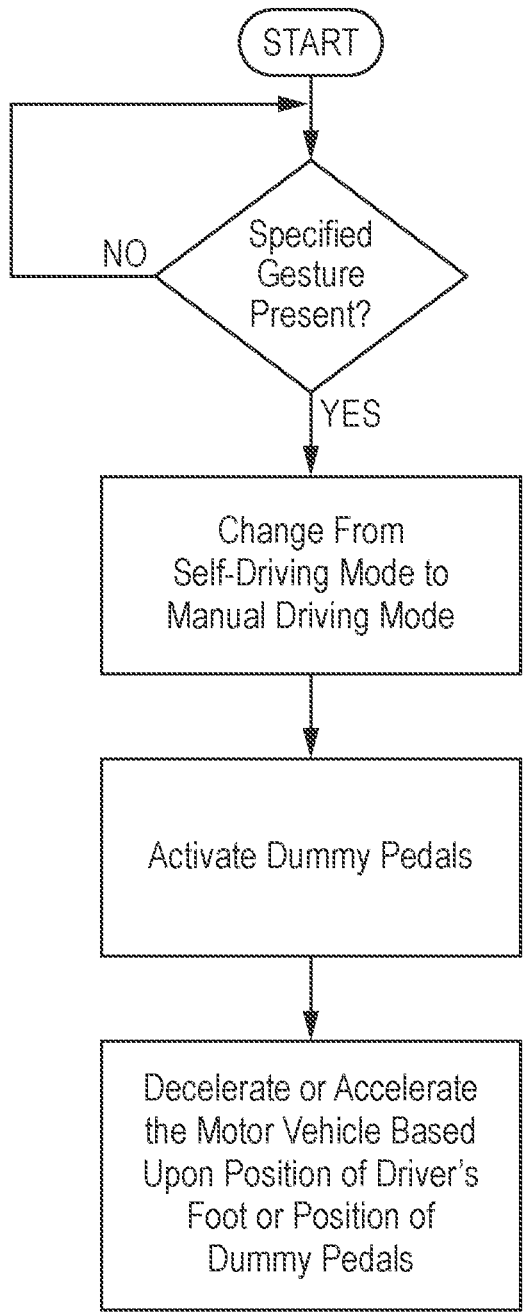
FIG. 5 is a block diagram showing a method for operating a self-driving motor vehicle.

Reference is now additionally made to FIGS. 3 and 4.

A dummy pedal 8 with two pedals in the present exemplary embodiment is represented, a first pedal 10*a* for a brake pedal and a second pedal 10*b* for a gas pedal. The first pedal 10*a* can be disposed on the center-left side in the footwell 4, whereas the second pedal 10*b* can be disposed on the right side in the footwell 4.

The first pedal 10*a* as well as the second pedal 10*b* in the present exemplary embodiment are each linked to the floor 22 in the footwell 4 with a link 20, such as for example a hinged joint.

In other words, in the present exemplary embodiment there is an upright pedal arrangement. As a difference from the present exemplary embodiment, there can also be a suspended pedal arrangement, in which the respective rotation points of the pedals 10*a*, 10*b* are at the top.

A spring 12 is disposed between the first pedal 10*a* or the second pedal 10*b* and the floor 22.

In the normal state, i.e., during the self-driving mode, the first pedal 10*a* and the second pedal 10*b* are lying flat on the floor 22, so that the respective spring 12 is compressed. In other words, the first pedal 10*a* and the second pedal 10*b* of the dummy pedal 8 are each spring-biased.

Alternatively, the first pedal 10*a* and the second pedal 10*b* can also be accommodated in respective recesses in the floor 22.

In operation, the gesture recognition device 6 continuously monitors the footwell 4 of the motor vehicle 2 and checks whether the specified gesture is present, i.e., whether a brake pedal operation and/or a gas pedal operation is present. For example, the specified gesture can be indicative of initiated emergency braking. In particular, braking maneuvers that start with a high brake pedal speed but then reduce in intensity before reaching the necessary braking pressure (negative brake pedal acceleration) are characteristic of emergency braking.

If a brake pedal operation and/or a gas pedal operation are present, a change from the self-driving mode into the manual driving mode is carried out in a first sub-step. In other words, an initial brake pedal operation and/or a gas pedal operation triggers the change from the self-driving mode into the manual driving mode.

With the change from the self-driving mode into the manual driving mode, the dummy pedal 8 is activated, i.e., the spring-biased pedal 10*a* and the second pedal 10*b* of the dummy pedal 8 are enabled. The respective springs 12 expand, so that the first pedal 10*a* and the second pedal 10*b* rise up from the floor 22 and the position represented in FIG. 3 is achieved.

In a second sub-step, in the manual driving mode at least one operating variable of the motor vehicle 2, in the present exemplary embodiment a deceleration of the motor vehicle 2, is now changed as a function of the position of the driver's right foot or the position of the first pedal 10*a* and/or an acceleration of the motor vehicle 2 is now changed as a function of the position of the driver's right foot or the position of the second pedal 10*b*.

The gesture recognition device 6 detects the position of the driver's right foot or the position of the first pedal 10*a* and/or the position of the second pedal 10*b* for this purpose and determines therefrom control signals for actuating the service brake system and/or the traction engine of the motor vehicle 2.

Thus, in the manual driving mode the driver can control or influence the motor vehicle 2 by means of gesture control. In this case, the gesture that causes the change from the self-driving mode into the manual driving mode is a movement indicative for example of emergency braking, whereas the gesture during the second sub-step is a position.

As a difference from the present exemplary embodiment, it can also be provided that the control unit 14 has requested the driver to take over control of the motor vehicle 2. In this case, as with the above second sub-step, in the manual driving mode at least one operating variable of the motor vehicle 2 is changed, for example a deceleration of the motor vehicle 2 as a function of the position of the driver's right foot or the position of the first pedal 10*a* and/or an acceleration of the motor vehicle 2 is changed as a function of the position of the driver's right foot or the position of the second pedal 10*b*.

Thus, when required a driver can take over control of the motor vehicle 2 in order to ensure road safety.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

REFERENCE CHARACTER LIST 2 motor vehicle
4 footwell
6 gesture recognition device
8 dummy pedal
10*a* pedal
10*b* pedal
12 spring
14 control unit
16 camera
18 driver's seat
20 link
22 floor

The invention claimed is:

1. A method for operating a self-driving motor vehicle, comprising:
    monitoring a footwell of the motor vehicle with a gesture recognition device;
    changing from a self-driving mode into a manual driving mode based on a driver gesture that corresponds to movement for carrying out emergency braking;
    releasing a spring-loaded dummy pedal in response to the change from the self-driving mode into the manual-driving mode triggered by the detection of the driver gesture that corresponds to movement for carrying out emergency braking; and
    in manual-driving mode, controlling the acceleration and/or deceleration of the vehicle based on the driver's foot position on the released dummy pedal.

2. The method as claimed in claim 1, wherein the spring-loaded dummy pedal includes an acceleration pedal and a brake pedal and, in manual-driving mode, the controlling acceleration is based on position of the driver's foot relative to the acceleration pedal and controlling deceleration is based on position of the driver's foot relative to the brake pedal.

3. The method as claimed in claim 1, wherein, in the manual-driving mode, at least one operating variable of the motor vehicle is varied as a function of the position of the driver's feet.

4. The method as claimed in claim 3, wherein the operating variable is a deceleration and/or an acceleration of the motor vehicle.

5. A vehicle comprising:
    a driver seat;
    a footwell vehicle-forward of the driver seat;
    a spring-loaded dummy pedal in the footwell; and
    a control unit programmed to:
        monitor a footwell of the motor vehicle with a gesture recognition device;
        change from a self-driving mode into a manual-driving mode based on a driver gesture that corresponds to movement for carrying out emergency braking;
        release a spring-loaded dummy pedal from a recess in response to the change from the self-driving mode into the manual-driving mode triggered by the detection of the driver gesture that corresponds to movement for carrying out emergency braking; and
        in the manual-driving mode, control the acceleration and/or deceleration of the vehicle based on the driver's foot position on the released dummy pedal.

6. The vehicle as claimed in claim 5, wherein the spring-loaded dummy pedal includes an acceleration pedal and a brake pedal and the control unit is programmed to, in manual-driving mode, control acceleration based on position of the driver's foot relative to the acceleration pedal and to control deceleration based on position of the driver's foot relative to the brake pedal.

7. The vehicle as claimed in claim 5, wherein, in the manual-driving mode, at least one operating variable of the motor vehicle is varied as a function of the position of the driver's feet.

8. The vehicle as claimed in claim 7, wherein the operating variable is a deceleration and/or an acceleration of the motor vehicle.

\* \* \* \* \*